US010965778B1

(12) United States Patent
Massover et al.

(10) Patent No.: US 10,965,778 B1
(45) Date of Patent: Mar. 30, 2021

(54) MULTIUNIT CHARGING DEVICE AND METHOD FOR PREEMPTIVE DATA UPLOAD

(71) Applicant: MOTOROLA SOLUTIONS, INC., Chicago, IL (US)

(72) Inventors: Alexander Massover, BatHefer (IL); Roey Fizichky, Petach Tequwa (IL); Nofar Kashel, Beer Sheva (IL); Oren Peled, Ramat Gan (IL); Tal Pasternak, Mazkeret Batya (IL); Ariel Levy, Petach Tikva (IL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 15 days.

(21) Appl. No.: 16/574,522

(22) Filed: Sep. 18, 2019

(51) Int. Cl.
*H04L 29/08* (2006.01)
*H02J 7/00* (2006.01)

(52) U.S. Cl.
CPC .......... *H04L 67/322* (2013.01); *H02J 7/0021* (2013.01); *H04L 67/06* (2013.01); *H02J 7/00034* (2020.01)

(58) Field of Classification Search
CPC .................................................. H04L 67/322
USPC ........................................................ 709/226
See application file for complete search history.

(56) References Cited

U.S. PATENT DOCUMENTS

| 10,530,820 | B2 * | 1/2020 | Van De Laar | ........ G06F 3/0383 |
| 2013/0282869 | A1 | 10/2013 | Mate et al. | |
| 2014/0269270 | A1 | 9/2014 | Wolcott et al. | |
| 2016/0014172 | A1 * | 1/2016 | Van De Laar | .......... H04W 4/00 709/229 |
| 2016/0259794 | A1 * | 9/2016 | Hickman | ............ G06F 11/1461 |
| 2017/0251050 | A1 * | 8/2017 | Masson | ............... H04L 67/1097 |
| 2018/0189224 | A1 * | 7/2018 | Vadivelu | ............. G06F 13/4022 |
| 2018/0375918 | A1 * | 12/2018 | Frazier | .................... H04L 67/06 |
| 2020/0104698 | A1 * | 4/2020 | Ladvocat Cintra | .... H04N 5/772 |

FOREIGN PATENT DOCUMENTS

| CN | 105656126 A | * | 6/2016 | |
| KR | 1020060025965 A | | 3/2006 | |
| WO | WO-2013102229 A2 | * | 7/2013 | ............. H04L 51/14 |

* cited by examiner

*Primary Examiner* — Hamza N Algibhah
(74) *Attorney, Agent, or Firm* — Perry + Currier, Inc.

(57) ABSTRACT

A multiunit charging device and method for preemptive data upload is provided. A multiunit charging device controls a first mobile device, received at a plurality of charging stations of the multiunit charging device, to upload first data via a communication unit. After upload of the first data has begun, the multiunit charging device detects that a second mobile device is received at the plurality of charging stations. When an amount of second data for upload at the second mobile device is smaller than a remaining amount of the first data for upload at the first mobile device, the multiunit charging device: preempts uploading of the first data at the first mobile device; and controls the second mobile device to upload the second data via the communication unit.

20 Claims, 6 Drawing Sheets

MULTIUNIT CHARGING DEVICE AND METHOD FOR PREEMPTIVE DATA UPLOAD

BACKGROUND OF THE INVENTION

Body-worn cameras, and other types of mobile devices used by first responders, are often provided to first responders from a pool of devices. At the end of a shift, and the like, a first responder places a mobile device used during the shift into a networked multi-unit charger, which charges the mobile device and causes upload of data (e.g. which may include evidence, and the like) collected by the mobile device to a central storage device, such as a database. The upload of the data may be generally performed in order of receipt of mobile devices, such that data from a first received mobile device is uploaded, and when the upload ends, data from a next received mobile device is uploaded, etc. Alternatively, upload of the data from all the mobile devices may occur simultaneously. Such schemes can be inefficient.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Body-worn cameras, and other types of mobile devices used by first responders, are often provided to first responders from a pool of devices. At the end of a shift, and the like, a first responder places a mobile device used during the shift into a networked multi-unit charger, which charges the mobile device and causes upload of data (e.g. which may include evidence, and the like) collected by the mobile device to a central storage device, such as a database. The upload of the data may be generally performed in order of receipt of mobile devices, such that data from a first received mobile device is uploaded, and when the upload ends, data from a next received mobile device is uploaded, etc. Such a scheme is inefficient. For example, other first responders may be waiting for the mobile devices to start a next shift, and when no mobile device is ready, the first responders must wait. Hence, when one of the mobile devices has a lot of data that is uploading, the remaining mobile devices must wait to upload, and the first responders must also wait for a mobile device to complete uploading to retrieve it, which may slow the start of the shift. Alternatively, upload of the data from all the mobile devices may occur simultaneously; again such schemes can be inefficient as bandwidth usage is distributed between all the mobile devices and slows down availability thereof.

An aspect of the specification provides a multi-unit charging device comprising: a plurality of charging stations for charging mobile devices and communicating with the mobile devices when charging; a communication unit; and a controller in communication with the plurality of charging stations and the communication unit, the controller configured to: control a first mobile device received at the plurality of charging stations to upload first data via the communication unit; after upload of the first data has begun, detect that a second mobile device is received at the plurality of charging stations; when an amount of second data for upload at the second mobile device is smaller than a remaining amount of the first data for upload at the first mobile device: preempt uploading of the first data at the first mobile device; and control the second mobile device to upload the second data via the communication unit.

Another aspect of the specification provides a method comprising: controlling, at a multiunit charging device, a first mobile device received at a plurality of charging stations of the multiunit charging device, to upload first data via a communication unit; after upload of the first data has begun, detecting, at the multiunit charging device, that a second mobile device is received at the plurality of charging stations; when an amount of second data for upload at the second mobile device is smaller than a remaining amount of the first data for upload at the first mobile device: preempting, at the multiunit charging device, uploading of the first data at the first mobile device; and controlling, at the multiunit charging device, the second mobile device to upload the second data via the communication unit.

Figure 1:
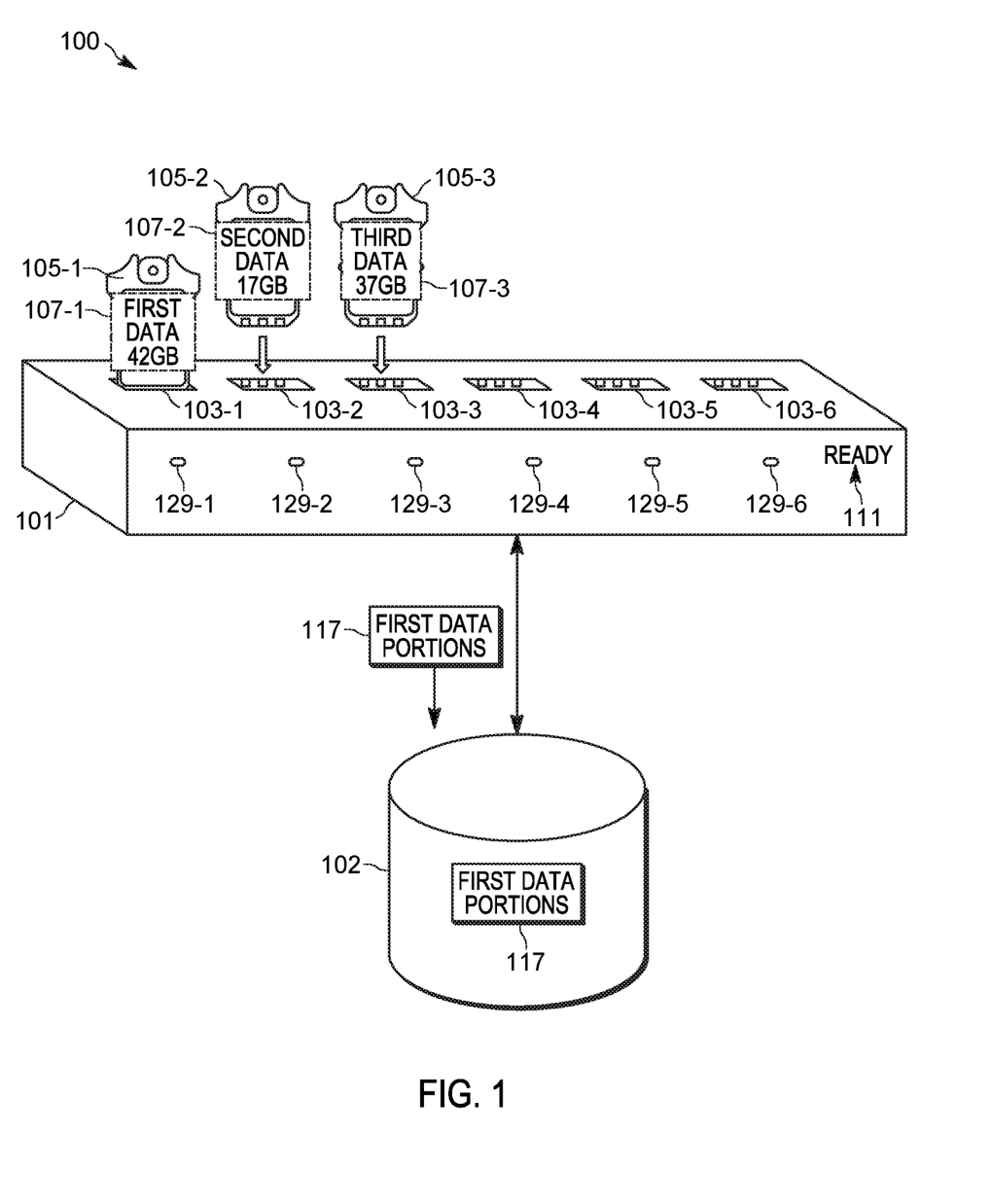
FIG. 1 is a system that includes a multiunit charging device for preemptive data upload, in accordance with some examples.

Attention is directed to FIG. 1, which depicts an example system 100 that includes a multiunit charger (MUC) 101 for preemptive data upload. As depicted, he MUC 101 is in communication with a database 102, for example via one or more communication links, depicted in FIG. 1, and throughout the present specification, as double-ended arrows between respective components; the communication links may include any suitable combination of wireless and/or wired links and/or wireless and/or wired communication networks. The database 102 may comprise, and/or be a component of, a central storage device and the like, including, but not limited to, a component of an evidence management system, and the like. The database 102 may be replaced, however, with any suitable memory device and/or central storage device.

The MUC 101 generally includes a plurality of charging stations 103-1, 103-2, 103-3, 103-4, 103-5, 103-6 for charging mobile devices 105-1 105-2, 105-3 (e.g. a first mobile device 105-1, a second mobile device 105-2, and a third mobile device 105-3) and communicating with the mobile devices 105-1 105-2, 105-3 when charging. The charging stations 103-1, 103-2, 103-3, 103-4, 103-5, 103-6 are interchangeably referred to hereafter, collectively, as the charging stations 103 and, generically, as a charging station 103. The mobile devices 105-1 105-2, 105-3 are interchangeably referred to hereafter, collectively, as the mobile devices 105 and, generically, as a mobile device 105.

In general, each of the mobile devices 105-1, 105-2, 105-3 stores respective first data 107-1, second data 107-2, and third data 107-3 for upload to the database 102, for example by the MUC 101. The first data 107-1, second data 107-2, and third data 107-3 is interchangeably referred to hereafter, collectively, as the data 107 and, generically, as a set of data 107 and/or data 107. A set of respective data 107 may be stored in a partition of a memory of a respective mobile device 105. The data 107 is depicted in dotted lines at the mobile devices 105 indicating that the data 107 is internal to the mobile devices 105. As depicted, initially, the first mobile device 105-1 stores 42 GB (gigabytes) of the first data 107-1, the second mobile device 105-2 stores 17 GB of the second data 107-2, and the third mobile device 105-3 stores 37 GB of the third data 107-3.

While as depicted, the MUC 101 includes six charging stations 103, the MUC 101 may include any suitable number of charging stations 103 including, but not limited to, as few as two charging stations 103. While only three mobile devices 105 are depicted, the system 100 may include any suitable number of mobile devices 105, including, but not limited to, as few as two mobile devices 105, a same number of the mobile devices 105 as a number of the charging stations 103, or a number of the mobile devices 105 that is larger than a number of the charging stations 103. For example, as mobile devices 105 are charged and respective data 107 is uploaded, more mobile devices 105 may be received at the MUC 101 as charged mobile devices 105 become ready (e.g. their respective data 107 is uploaded, as described below).

While as depicted the mobile devices 105 comprise BWCs, the mobile devices 105 may comprise any suitable type of mobile device including, but not limited to, portable radios, land-mobile radios, mobile phones, and the like.

A set of data 107 at a mobile device 105 may comprise one or more files and/or video files and/or image files and/or audio files and/or multimedia files and/or any suitable type of data collected by a mobile device 105, for example during a shift including, but not limited to, Global Positioning System (GPS) data, phone record data, and the like.

For example a mobile device 105 may be configured to collect respective data 107 during a shift and store the data 107 in a partition of a respective memory. As such, the data 107 may comprise evidence for storage at the database 102, which may be used later for investigation of crimes, in a court case, and the like.

In general, the mobile devices 105 are received at the charging stations 103, for example, at the end of a shift. As depicted, a first mobile device 105-1 is received in a first charging station 103-1. The other mobile devices 105-2, 105-3 may be received at a respective charging station 103 in any suitable order. As depicted, a second mobile device 105-2 is being received at a second charging station 103-2, for example after the first mobile device 105-1 is received at the first charging station 103-1, and a third mobile device 105-3 is being received at a third charging station 103-3, for example after the mobile devices 105-1, 105-2 are received at the respective charging stations 103-1, 103-2. While the mobile devices 105-1, 105-2, 105-3 are described herein as being respectively received at the charging stations 103-1, 103-2, 103-3, the mobile devices 105-1, 105-2, 105-3 may be received at any charging station 103 that does not already have a mobile device 105 received therein.

Furthermore, receipt of a mobile device 105 at a charging station 103 is indicated in FIG. 1, and throughout the present specification, via a respective arrow from a mobile device 105 to a respective charging station 103.

In some examples, the mobile devices 105 may be placed in a charging station 103 by a first responder, for example at the end of a shift and other first responder may wait a mobile device 105 to be ready so that the mobile device 105 may be retrieve for use during a next shift. A mobile device 105 may be "ready" when a battery thereof is charged, and respective data 107 is uploaded to the database 102.

Furthermore, while present examples are described with respect to the MUC 101 and the mobile devices 105 being associated with, and/or used by, first responders, the MUC 101 and the mobile devices 105 being associated with, and/or used by, any suitable users that use mobile devices 105, including, but not limited to, volunteers of a volunteer organization, employees of a business entity, and the like. For example, when the mobile devices 105 are used by employees of a business entity, the data 107 may comprise Global GPS data (e.g. representing routes driven by the employees, for example when the employees are delivering goods, and the like), phone record data, and the like, collected by the mobile devices 105 for storage at the database 102 and/or any suitable central storage facility.

The mobile devices 105 generally include cell contacts which contact respective cell contacts at a charging station 103 used to charge a battery of a mobile device 105 (e.g. via a battery charger of the MUC 101, described below). Similarly the mobile devices 105 include one or more data contacts which contact respective data contacts at a charging station 103 and which are used to access a respective memory partition of a mobile device 105 to upload the data 107 to the database 102, as described in more detail below.

For example, as depicted, the MUC 101 is accessing the first data 107-1 of the first mobile device 105-1 via the charging station 103-1 and controls the first mobile MUC 101-1 to upload first data portions 117 (e.g. portions of the first data 107-1, such as files and/or portions of files of the first data 107-1) to the database 102 for storage. As the first data 107-1 is uploaded, the first data 107-1 may be erased and/or deleted from the mobile device 105-1.

However, when the second mobile device 105-2 is received at the charging station 103-2 (e.g. in present examples prior to the third mobile device 105-3 being received), the MUC 101 may query the mobile devices 105-1, 105-2 to determine a remaining amount of the first data 107-1 for upload and an amount of the second data 107-2 for upload. When the amount of the second data 107-2 for upload at the second mobile device 105-2 is smaller than a remaining amount of the first data 107-1 for upload at the first mobile device 105-1, the MUC 101: preempts uploading of the first data 107-1 at the first mobile device 105-1; and controls the second mobile device 105-2 to upload the second data 107-2, as described hereafter. When the upload of the second data 107-2 is complete, upload of the first data 107-1 may resume.

Alternatively, when the third mobile device 105-3 has been received at the charging station 103-3 (e.g. during upload of the first data 107-1 and/or upload of the second data 107-2), and/or more mobile devices 105 have been received at respective charging stations 103, the MUC 101 may determine respective remaining amounts of respective data for upload of all of the mobile devices 105 received at the plurality of charging stations 103, and control a mobile device 105 that has a least amount of respective data 107 to upload their respective data 107. Indeed, the MUC 101 is generally configured to determine a priority order of upload of respective data 107 of the mobile devices 105 based on respective total size of files and/or data 107 stored at the mobile devices 105 received at the plurality of charging stations 103.

As depicted, the MUC 101 further comprise notification devices 129-1, 129-2, 129-3, 129-4, 129-5, 129-6 in a one-to-one relationship with the charging stations 103. The notification devices 129-1, 129-2, 129-3, 129-4, 129-5, 129-6 will be interchangeably referred to hereafter, collectively, as the notification devices 129 and, generically, as a notification device 129. As depicted, the notification devices 129 may comprises lights, such as light emitting diodes (LEDs) and the like, which may be controlled to indicate that upload of data 107 from a mobile device 105 received at a respective charging station 103 is complete. Optional text 111 "READY", and the like may be printed adjacent the notification devices 129 (e.g. on chassis of the MUC 101) to indicate that, when a light of a notification device 129 is in on-state, a respective mobile device 105 in a respective charging station 103 is ready to be retrieved for use, for example by a first responder waiting for a mobile device 105. Put another way, the notification devices 129 are generally in an off-state, and when a light of a notification device 129 is controlled to an on-state, the notification device 129 indicates that upload of data 107 from a mobile device 105 received at a respective charging station 103 is complete. When a mobile device 105 that is "READY" is retrieved from a charging station 103, the MUC 101 controls the light of a notification device 129 back to an off-state While the notification devices 129 are depicted in a one-to-one relationship with the charging stations 103, in other examples, the MUC 101 may comprise as few as one notification device 129, such as a display screen, a speaker, and the like, which may be controlled to indicate that upload of data 107 is complete for a mobile device 105.

Figure 2:
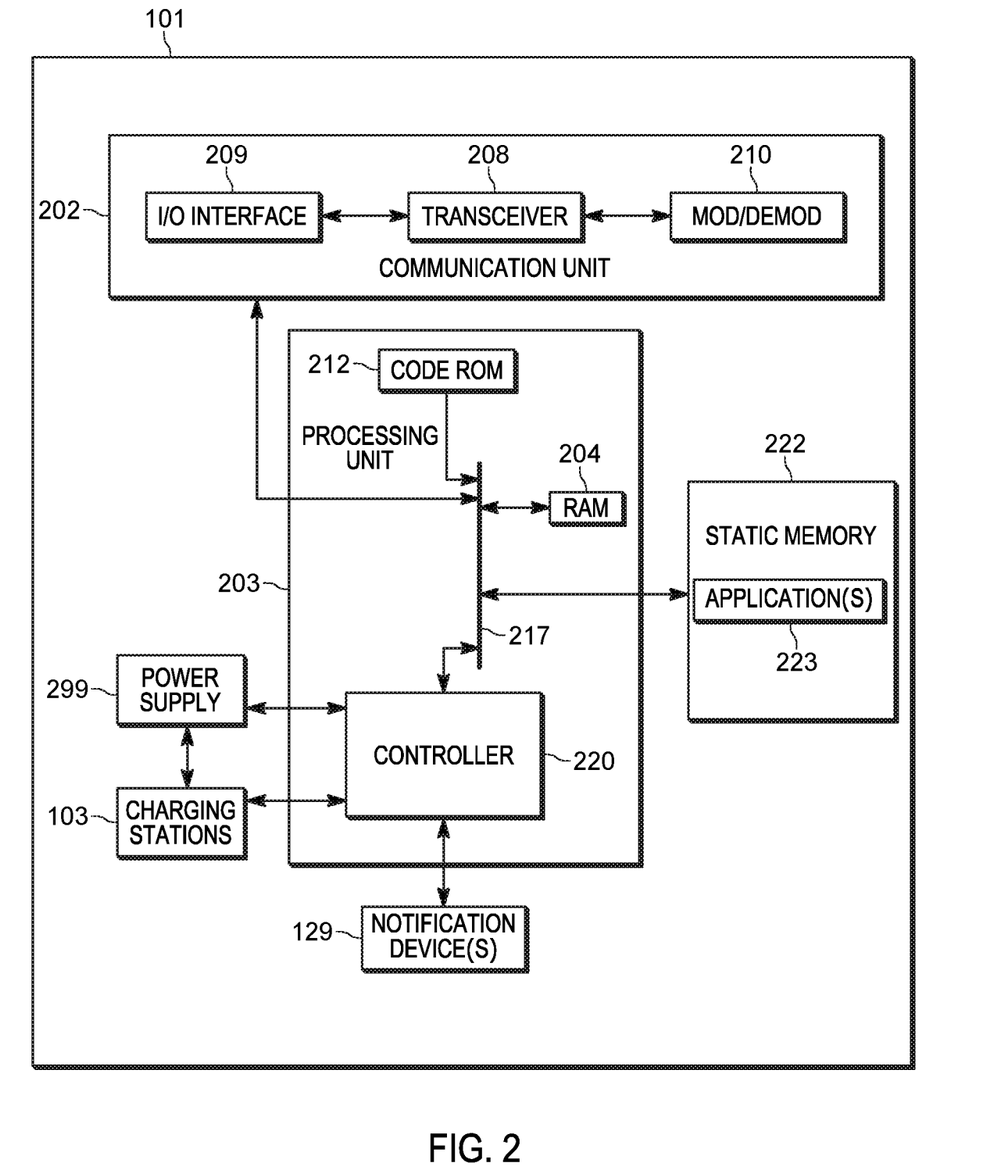
FIG. 2 is a device diagram showing a device structure of a multiunit charging device for preemptive data upload, in accordance with some examples.

Attention is next directed to FIG. 2 which depicts a schematic block diagram of an example of the MUC 101. As depicted, the MUC 101 comprises: the charging stations 103, at least one notification device 129, a communication unit 202, a processing unit 203, a Random-Access Memory (RAM) 204, one or more wireless transceivers 208 (which may be optional), one or more wired and/or wireless input/output (I/O) interfaces 209, a combined modulator/demodulator 210, a code Read Only Memory (ROM) 212, a common data and address bus 217, a controller 220, a static memory 222 storing at least one application 223, and a power supply 299. Hereafter, the at least one application 223 will be interchangeably referred to as the application 223.

The power supply 299 may be configured to electrically connect to a mains power supply, and may include one or more battery chargers used to provide power to the charging stations 103 for example via respective cell contacts. In some examples, each charging station 103 may be provided with a respective power supply 299 and/or a respective battery charger.

As shown in FIG. 2, the MUC 101 includes the communication unit 202 communicatively coupled to the common data and address bus 217 of the processing unit 203.

The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory 204 and the static memory 222.

The communication unit 202 may include one or more wired and/or wireless input/output (I/O) interfaces 209 that are configurable to communicate with the database 102, and the like. For example, the communication unit 202 may include one or more transceivers 208 and/or wireless transceivers for communicating with the database 102, and the like. Hence, the one or more transceivers 208 may be adapted for communication with one or more communication links and/or communication networks used to communicate with the database 102, and the like. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) networks, a 5G network, a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a Bluetooth transceiver, a Wi-Fi transceiver, a WiMAX transceiver, and/or another similar type of wireless transceiver configurable to communicate via a wireless radio network.

The communication unit 202 may include one or more wireline transceivers 208, for communicating with the database 102, and the like, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The controller 220 may include ports (e.g. hardware ports) for coupling to other hardware components of the MUC 101, such as the data contacts of the charging stations 103, the notification devices 129, and the power supply 299.

The controller 220 includes one or more logic circuits, one or more processors, one or more microprocessors, one or more ASIC (application-specific integrated circuits) and one or more FPGA (field-programmable gate arrays), and/or another electronic device. In some examples, the controller 220 and/or the MUC 101 is not a generic controller and/or a generic multiunit charging device, but a device specifically configured to implement functionality for preemptive data upload. For example, in some examples, the MUC 101 and/or the controller 220 specifically comprises a computer executable engine configured to implement functionality for preemptive data upload.

The static memory 222 is a non-transitory machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 2, programming instructions (e.g., machine readable instructions) that implement the functional teachings of the MUC 101 as described herein are maintained, persistently, at the memory 222 and used by the controller 220 which makes appropriate utilization of volatile storage during the execution of such programming instructions.

Figure 3:
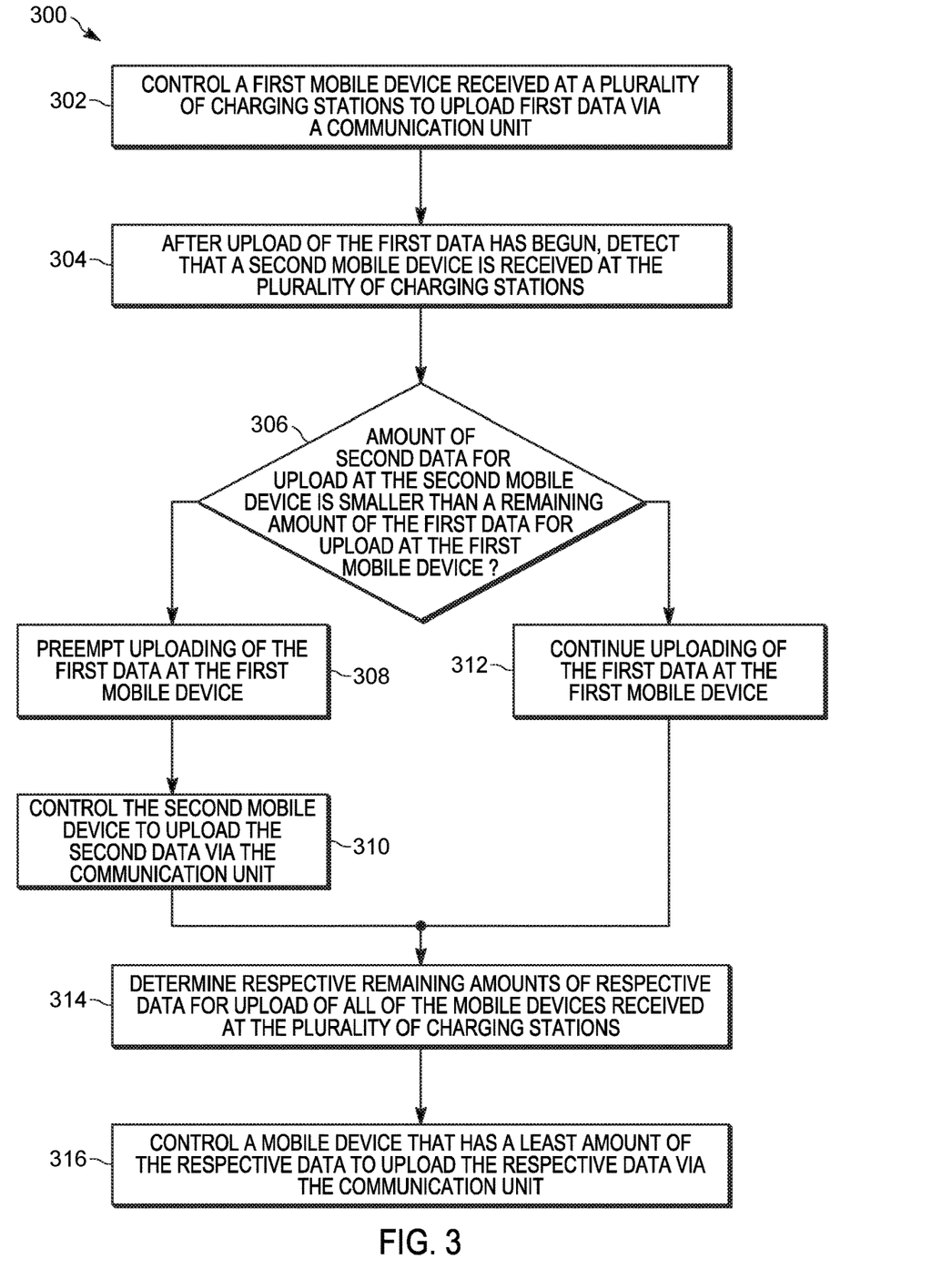
FIG. 3 is a flowchart of a method for preemptive data upload at a multiunit charging device, in accordance with some examples.

In particular, the memory 222 stores instructions corresponding to the at least one application 223 that, when executed by the controller 220, enables the controller 220 to implement functionality for preemptive data upload including, but not limited to, the blocks of the method set forth in FIG. 3.

In illustrated examples, when the controller 220 executes the one or more applications 223, the controller 220 is enabled to: control a first mobile device 105-1 received at a plurality of charging stations 103 to upload first data 107-1 via the communication unit 202; after upload of the first data 107-1 has begun, detect that a second mobile device 105-2 is received at the plurality of charging stations 103; when an amount of second data 107-2 for upload at the second mobile device 105-2 is smaller than a remaining amount of the first data 107-1 for upload at the first mobile device 105-1: preempt uploading of the first data 107-1 at the first mobile device 105-1; and control the second mobile device 105-2 to upload the second data 107-2 via the communication unit 202.

Attention is now directed to FIG. 3 which depicts a flowchart representative of a method 300 for preemptive data upload. The operations of the method 300 of FIG. 3 correspond to machine readable instructions that are executed by the MUC 101, and specifically the controller 220 of the MUC 101. In the illustrated example, the instructions represented by the blocks of FIG. 3 are stored at the memory 222 for example, as the application 223. The method 300 of FIG. 3 is one way in which the controller 220 and/or the MUC 101 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps."

The method 300 of FIG. 3 may be implemented on variations of the system 100 of FIG. 1, as well. For example, while the method 300 is described with respect to the controller 220 and/or the MUC 101 implementing the method 300, in other examples, a computing device in communication with the MUC 101, and external to the MUC 101, may implement the method 300, for example to control the MUC 101 for preemptive data upload.

At a block 302, the controller 220 and/or the MUC 101 controls a first mobile device 105-1 received at the plurality of charging stations 103 to upload first data 107-1 via the communication unit 202. For example, the controller 220 and/or the MUC 101 may communicate with the first mobile device 105-1 and/or transmit a command to a controlled of the first mobile device 105-1 to cause the first mobile device 105-1 to communicate with the database 102 via the MUC 101 and to upload the first data 107-1 to the database 102.

At a block 304, the controller 220 and/or the MUC 101, after upload of the first data 107-1 has begun, detects that a second mobile device 105-2 is received at the plurality of charging stations 103.

At a block 306, the controller 220 and/or the MUC 101 determines whether an amount of second data 107-2 for upload at the second mobile device 105-2 is smaller than a remaining amount of the first data 107-1 for upload at the first mobile device 105-1. For example, the controller 220 and/or the MUC 101 may query each of the first mobile device 105-1 and the second mobile device 105-2 to determine the amount of second data 107-2 and the remaining amount of the first data 107-1, for example via respective data contacts The amount of the second data 107-2 may comprises a total size of all files stored in a partition of a memory at the second mobile device 105-2. Similarly, the remaining amount of the first data 107-1 may comprises a respective total size of all respective files, stored in a respective partition of a respective memory at the first mobile device 105-1, that have not yet been uploaded. The mobile device 105-1 and/or controller 220 and/or the MUC 101 may generally track the amount of the first data 107-1 that has been uploaded (e.g. the first data portions 117) and/or the remaining amount of the first data 107-1 to be uploaded. Alternatively, the first mobile device 105-1 may erase and/or delete the first data 107-1 as the first data 107-1 is uploaded, and the remaining amount of the first data 107-1 to be uploaded may comprise the first data 107-1 remaining at the first mobile device 105-1.

When the amount of second data 107-2 for upload at the second mobile device 105-2 is smaller than the remaining amount of the first data 107-1 for upload at the first mobile device 105-1 (e.g. a "YES" decision occurs at the block 306), at a block 308, the controller 220 and/or the MUC 101 preempts uploading of the first data 107-1 at the first mobile device 105-1. For example, the controller 220 and/or the MUC 101 may transmit a command to the controller of the first mobile device 105-1 to cause the first mobile device 105-1 to stop and/or pause uploading of the first data 107-1. Regardless, at the block 308, uploading of the first data 107-1 is stopped and/or paused and/or interrupted so that the second data 107-2 may be uploaded.

In particular, at a block 310, the controller 220 and/or the MUC 101 controls the second mobile device 105-2 to upload the second data 107-2 via the communication unit 202.

Returning briefly to the block 306, when the amount of second data 107-2 for upload at the second mobile device 105-2 is not smaller than the remaining amount of the first data 107-1 for upload at the first mobile device 105-1 (e.g. a "NO" decision occurs at the block 306), at a block 312, the controller 220 and/or the MUC 101 continues uploading of the first data 107-1 at the first mobile device 105-1.

When the block 310 is implemented, the controller 220 and/or the MUC 101 determines when upload of the second data 107-2 is complete; when the block 312 is implemented, the controller 220 and/or the MUC 101 determines when upload of the first data 107-1 is complete. Regardless of which of the blocks 310, 312 is implemented, when upload of data 107 of a mobile device 105 is complete, at a block 314, the controller 220 and/or the MUC 101 determines respective remaining amounts of respective data 107 for upload of all of the mobile devices 105 received at the plurality of charging stations 103; and, at a block 316, the controller 220 and/or the MUC 101 controls a mobile device 105 that has a least amount of the respective data 107 to upload the respective data 107 via the communication unit 202.

For example, when the block 310 is implemented, when upload of the second data 107-2 is complete, at a block 314, the controller 220 and/or the MUC 101 determines respective remaining amounts of respective data 107 for upload of all of the mobile devices 105 received at the plurality of charging stations 103; and, at a block 316, the controller 220 and/or the MUC 101 controls a mobile device 105 that has a least amount of the respective data 107 to upload the respective data 107 via the communication unit 202.

Put another way, the controller 220 and/or the MUC 101 may be generally configured to: whenever current upload of data 107 of a mobile device 105 received at the plurality of charging stations 103 is completed: begin upload of respective data 107 of a next mobile device 105 received at the plurality of charging stations 103, based on an amount of the respective data 107 of the next mobile device 105 being smaller than the respective data 107 for upload of other mobile devices 105 received at the plurality of charging stations 103. The term "next mobile device" in this context refers to a next mobile device 105 that is to upload respective data 107 and not an order of receipt of a mobile device 105 at the charging stations 103.

In some examples, a respective total size of files stored (e.g. as the data 107) at the mobile devices 105 received at the plurality of charging stations 103 may be used by the controller 220 and/or the MUC 101 to determines a priority order of upload of respective data 107 of the mobile devices 105. Indeed, when a new mobile device 105 is received at the charging stations 103 while the second mobile device 105-2 is uploading the second data 107-2 at the block 310, the controller 220 and/or the MUC 101 may preempt uploading of the second data 107-2 when the new device 105 has an amount of data 107 for upload that is smaller than the remaining amount of the second data 107-2 for upload.

Put yet another way, the controller 220 and/or the MUC 101 may be further configured to, whenever a new mobile device 105 is received at the plurality of charging stations 103, the new mobile device 105 having a smaller amount of data 107 for upload than other mobile devices 105 received at the plurality of charging stations 103, including a mobile device 105 currently uploading respective data 107: preempt current upload of the respective data 107 of the mobile device 105; and upload the data 107 of the new mobile device 105. When the upload of the data 107 of the new mobile device 105 is complete, and/or when another mobile device 105 is received, the controller 220 and/or the MUC 101 again determines which of the mobile devices 105 is to upload respective data 107 based on respective amounts of data 107 for upload and preempts a mobile device 105 currently uploading data 107 when another devices has a smaller amount of data 107 for upload.

While not depicted in the method 300, when upload of data 107 of a mobile device 105 is complete the controller 220 and/or the MUC 101 may control a notification device 129 to indicate that upload of the data 107 is complete for the mobile device 105. For example, when upload of the second data 107-2 is complete, the controller 220 and/or the MUC 101 may control the notification device 129-2 to indicate that upload of the second data 107-2 is complete for the second mobile device 105-2.

In some examples, the controller 220 and/or the MUC 101 may control another notification device, other than a notification device 129, to indicate that upload of data 107 is complete for a mobile device 105. For example, the controller 220 and/or the MUC 101 may control a notification device of a mobile device 105, for which upload of respective data 107 was completed, to indicate completion of data upload, including, but not limited to, controlling a display screen, a light, a speaker, and the like, of the mobile device 105.

In other examples, the controller 220 and/or the MUC 101 may control a notification device of yet another device, for example a device external to the MUC 101, to indicate completion of data upload; such a device may be local or remote to the MUC 101, such as communication device adjacent to the MUC 101 (e.g. which assigns the mobile devices 105 to particular first responders) and/or a remote communication device (e.g. which assigns the mobile devices 105 to particular first responders) and/or a computing device controlling the MUC 101 to implement the method 300. In these examples, the controller 220 and/or the MUC 101 may control the notification device of the local or remote device and/or external computing device by transmitting a message to the local or remote device and/or external computing device that indicates completion of data upload for a particular mobile device 105. For example, when upload of the second data 107-2 is complete for the second mobile device 105-2 (as described below with respect to FIG. 4 and FIG. 5), the controller 220 and/or the MUC 101 may transmit a message to an external computing device to indicate that upload of the second data 107-2 is complete for the second mobile device 105-2.

Figure 4:
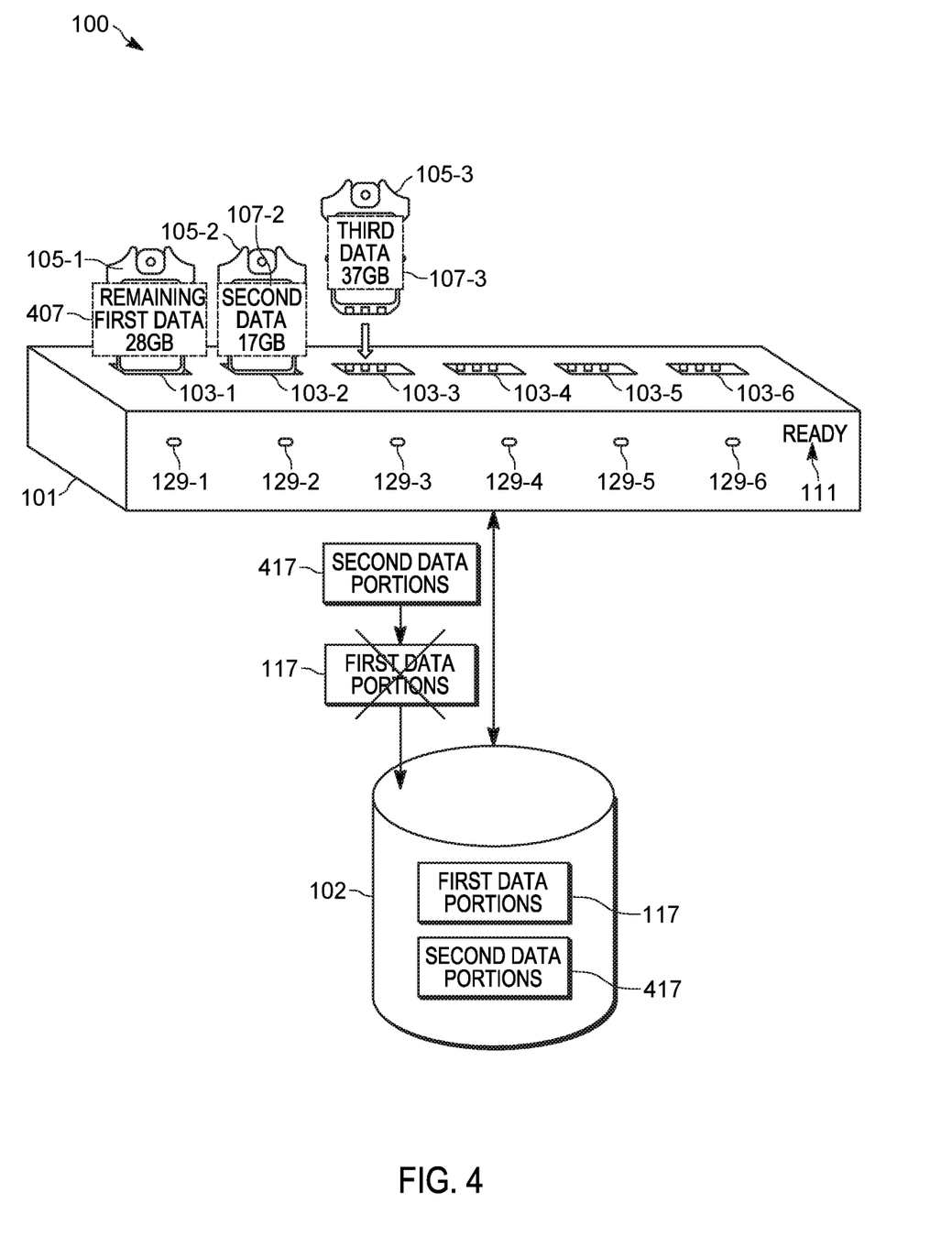
FIG. 4 depicts the system of FIG. 1 implementing a method for preemptive data upload, in accordance with some examples.

Attention is next directed to FIG. 4 which is substantially similar to FIG. 1, with like components having like numbers, and which depicts the MUC 101 implementing the method 300. In particular, the MUC 101 receives the second mobile device 105-2 at the charging station 103-2 while the first mobile device 105-1 is uploading the first data 107-1 as the first data portions 117 (e.g. the MUC 101 has controlled the first mobile device 105-1 to upload the first data 107-1 at the block 302 of the method 300).

The MUC 101 detects (e.g. at the block 304 of the method 300) that the second mobile device 105-2 is received, and determines (e.g. at the block 306 of the method 300): the amount of the second data 107-2 for upload; and the remaining amount 407 of the first data 107-1 for upload. In the depicted example, the amount of the second data 107-2 for upload is 17 GB, and the remaining amount 407 of the first data 107-1 for upload is 28 GB. Hence, the MUC 101 determines that the amount of the second data 107-2 for upload is smaller than the remaining amount 407 of the first data 107-1 (e.g. a "YES" decision occurs at the block 306 of the method 300) and preempts (e.g. at the block 308 of the method 300) upload of the first data 107-1. For example, uploading of the first data portions 117 is stopped (as represented by an "X" therethrough in FIG. 4), and the MUC 101 controls (e.g. at the block 310 of the method 300) the second mobile device 105-2 to upload the second data 107-2 to the database 102, for example as second data portions 417, which are stored at the database 102.

Figure 5:
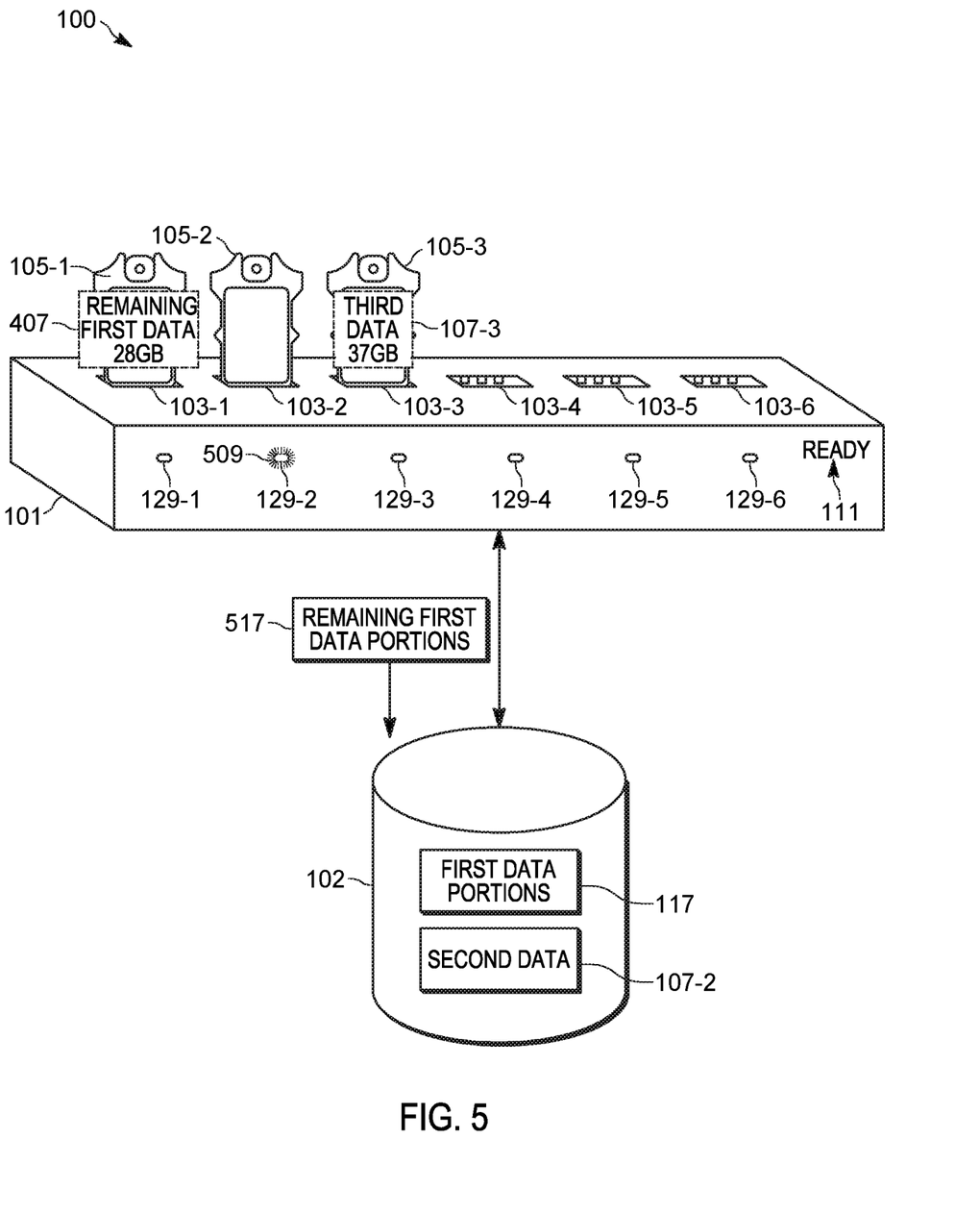
FIG. 5 depicts the system of FIG. 1 continuing to implement a method for preemptive data upload, in accordance with some examples.

Attention is next directed to FIG. 5 which is substantially similar to FIG. 4, with like components having like numbers, and which depicts the MUC 101 continuing to implement the method 300. In particular, in FIG. 5, upload of the second data 107-2 has completed and the second data 107-2 is stored at the database 102 (e.g. all the second data portions 417 are stored as the second data 107-2). In response, the MUC 101 controls a light of the notification device 129-2, associated with the charging station 103-2, from an off-state to an on-state to indicate that the mobile device 105-2 is ready to be retrieved from the MUC 101 for use, for example by a first responder. The on-state of the notification device 129-2 is indicated in FIG. 5 by light 509 emitted therefrom.

The MUC 101 determines (e.g. at the block 314) respective remaining amounts of respective data 107 for upload of all of the mobile devices 105 received at the plurality of charging stations 103. For example, the MUC 101 may determine (e.g. at the block 314 of the method 300) that the remaining amount 407 of the first data 107-1 is 28 GB and the amount of the third data 107-3 is 37 GB; in some examples, while not depicted the MUC 101 may determine that a remaining amount of the second data 107-2 is "0", as upload of the second data 107-2 was completed.

As the mobile device 105-1 has a least amount of the respective data 107-1 to upload (e.g. the remaining amount 407 of the first data 107-1 being smaller than the amount of the third data 107-3), the MUC 101 controls (e.g. at the block 316 of the method 300) the mobile device 105-1 to upload the respective data 107-1 (e.g. the remaining amount 407 of the first data 107-1) to the database 102. Put another way, upload of remaining first data portions 517 occurs and/or upload of the first data 107-1 continues.

Figure 6:
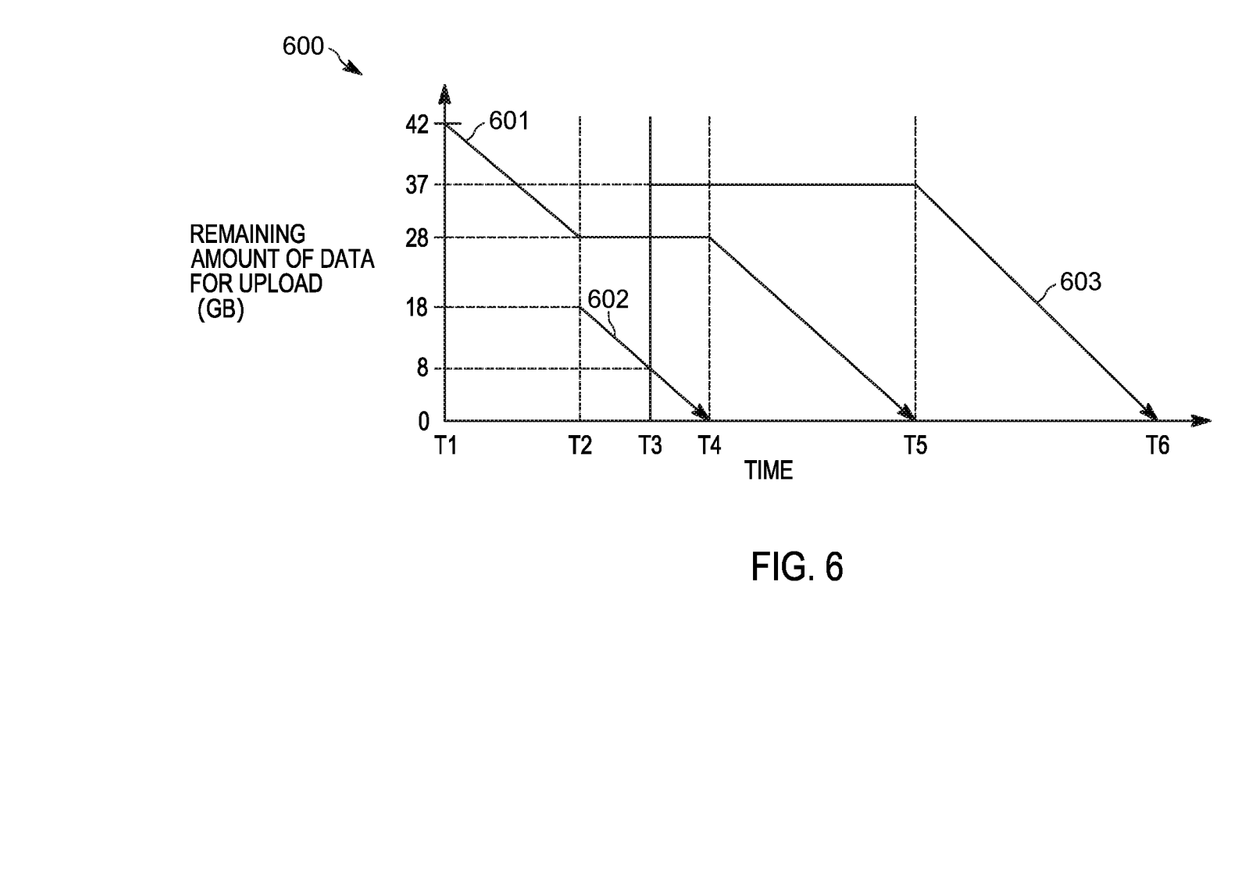
FIG. 6 depicts a graph of remaining data for upload at a multiunit charging device for three mobile devices received at different times, in accordance with some examples.

Attention is next directed to FIG. 6 which depicts a graph 600 of a remaining amount of data for upload (e.g. y-axis) vs. time (e.g. x-axis) from the MUC 101 to the database 102 (for example) for the three mobile devices 105 of the example in FIG. 4 and FIG. 5, received at the charging stations 103 different respective times, T1, T2, T3.

The curve 601 represents upload of the first data 107-1 for the first mobile device 105-1, the curve 602 represents upload of the second data 107-2 for the second mobile device 105-2, and the curve 603 represents upload of the third data 107-3 for the third mobile device 105-3.

For example, the first mobile device 105-1 may be received at a charging station 103 at the time T1, and the MUC 101 begins upload of the first data 107-1 starting at 42 GB; the remaining first data 107-1 for upload reduces over time as the first data 107-1 is uploaded, as represented by the curve 601 decreasing over time.

At the time T2, during upload of the first data 107-1, the second mobile device 105-2 may be received at a charging station 103, and the MUC 101 determines that the amount (e.g. 18 GB) of the second data 107-2 is less than the amount (e.g. 28 GB) of the first data 107-1 remaining for upload at the time T2. Hence, upload of the first data 107-1 is preempted and upload of the second data 107-2 begins. While the second data 107-2 is uploading, as represented by the curve 602 reducing over time, the amount (e.g. 28 GB) of the first data 107-1 remaining for upload does not change, as represented by the curve 601 being flat and/or at a same value (e.g. 28 GB) while the second data 107-2 is uploading.

At the time T3, during upload of the second data 107-2, the third mobile device 105-3 may be received at a charging station 103, and the MUC 101 determines that the amount (e.g. 8 GB) of the second data 107-2 remaining for upload at the time T3 is less than the amount (e.g. 28 GB) of the first data 107-1 remaining for upload at the time T3. The MUC 101 further determines that the amount (e.g. 8 GB) of the second data 107-2 remaining for upload at the time T3 is less than the amount (e.g. 37 GB) of the third data 107-3 for upload at the time T3. Hence, upload of the second data 107-2 continues. While the second data 107-2 is uploading, the amount (e.g. 37 GB) of the third data 107-3 for upload does not change, as represented by the curve 603 being flat and/or at a same value (e.g. 37 GB) while the second data 107-2 is uploading.

At a time T4, upload of the second data 107-2 completes (e.g. the curve 602 falls to "0"), and the second mobile device 105-2 is hence ready to be used, for example faster than if the MUC 101 had not preempted the upload of the first data 107-1. The MUC 101 determines that the amount (e.g. 28 GB) of the first data 107-1 remaining for upload at the time T4 is less than the amount (e.g. 37 GB) of the third data 107-3 for upload at the time T4. Hence, upload of the first data 107-1 resumes as represented by the curve 602 again decreasing at the time T4. While the first data 107-1 is uploading, the amount (e.g. 37 GB) of the third data 107-3 for upload does not change, as represented by the curve 603 being flat and/or at a same value (e.g. 37 GB).

At a time T5, upload of the first data 107-1 completes, and the first mobile device 105-1 is hence ready to be used. Only the third data 107-3 remains to be uploaded. Hence, the third data 107-3 starts uploading, as represented by the curve 603 decreasing between the time T5 and a time T6 (e.g. when upload of the third data 107-3 is complete).

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A multi-unit charging device comprising:
a plurality of charging stations for charging mobile devices and communicating with the mobile devices when charging;
a communication unit; and
a controller in communication with the plurality of charging stations and the communication unit, the controller configured to:
control a first mobile device received at the plurality of charging stations to upload first data via the communication unit;
after upload of the first data has begun, detect that a second mobile device is received at the plurality of charging stations;
when an amount of second data for upload at the second mobile device is smaller than a remaining amount of the first data for upload at the first mobile device:
preempt uploading of the first data at the first mobile device; and
control the second mobile device to upload the second data via the communication unit.

2. The multi-unit charging device of claim 1, wherein the controller is further configured to, when upload of the second data is complete:
determine respective remaining amounts of respective data for upload of all of the mobile devices received at the plurality of charging stations; and
control a mobile device that has a least amount of the respective data to upload the respective data via the communication unit.

3. The multi-unit charging device of claim 1, wherein the controller is further configured to, when upload of the second data is complete:
control a notification device to indicate that upload of the second data is complete for the second mobile device.

4. The multi-unit charging device of claim 3, further comprising the notification device.

5. The multi-unit charging device of claim 1, wherein the controller is further configured to, when upload of the second data is complete:
transmitting a message to an external computing device to indicate that upload of the second data is complete for the second mobile device.

6. The multi-unit charging device of claim 1, wherein the controller is further configured to:
query each of the first mobile device and the second mobile device to determine the amount of second data and the remaining amount of the first data.

7. The multi-unit charging device of claim 1, wherein the amount of the second data comprises a total size of all files stored in a partition of a memory at the second mobile device; and
the remaining amount of the first data comprises a respective total size of all respective files, stored in a respective partition of a respective memory at the first mobile device, that have not yet been uploaded.

8. The multi-unit charging device of claim 1, wherein a respective total size of files stored at the mobile devices received at the plurality of charging stations determines a priority order of upload of respective data of the mobile devices.

9. The multi-unit charging device of claim 1, wherein the controller is further configured to, whenever a new mobile device is received at the plurality of charging stations, the new mobile device having a smaller amount of data for upload than other mobile devices received at the plurality of charging stations, including a mobile device currently uploading respective data:
preempt current upload of the respective data of the mobile device; and
upload the data of the new mobile device.

10. The multi-unit charging device of claim 1, wherein the controller is further configured to, whenever current upload of data of a mobile device received at the plurality of charging stations is completed:
begin upload of respective data of a next mobile device received at the plurality of charging stations, based on an amount of the respective data of the next mobile device being smaller than the respective data for upload of other mobile devices received at the plurality of charging stations.

11. A method comprising:
controlling, at a multiunit charging device, a first mobile device received at a plurality of charging stations of the multiunit charging device, to upload first data via a communication unit;

after upload of the first data has begun, detecting, at the multiunit charging device, that a second mobile device is received at the plurality of charging stations;

when an amount of second data for upload at the second mobile device is smaller than a remaining amount of the first data for upload at the first mobile device:

preempting, at the multiunit charging device, uploading of the first data at the first mobile device; and controlling, at the multiunit charging device, the second mobile device to upload the second data via the communication unit.

12. The method of claim 11, further comprising, when upload of the second data is complete:

determining respective remaining amounts of respective data for upload of all of the mobile devices received at the plurality of charging stations; and controlling a mobile device that has a least amount of the respective data to upload the respective data via the communication unit.

13. The method of claim 11, further comprising, when upload of the second data is complete:

controlling a notification device to indicate that upload of the second data is complete for the second mobile device.

14. The method of claim 13, wherein the notification device is located at the multiunit charging device.

15. The method of claim 11, further comprising, when upload of the second data is complete:

transmitting a message to an external computing device to indicate that upload of the second data is complete for the second mobile device.

16. The method of claim 11, further comprising:

querying each of the first mobile device and the second mobile device to determine the amount of second data and the remaining amount of the first data.

17. The method of claim 11, wherein the amount of the second data comprises a total size of all files stored in a partition of a memory at the second mobile device; and the remaining amount of the first data comprises a respective total size of all respective files, stored in a respective partition of a respective memory at the first mobile device, that have not yet been uploaded.

18. The method of claim 11, wherein a respective total size of files stored at the mobile devices received at the plurality of charging stations determines a priority order of upload of respective data of the mobile devices.

19. The method of claim 11, further comprising, whenever a new mobile device is received at the plurality of charging stations, the new mobile device having a smaller amount of data for upload than other mobile devices received at the plurality of charging stations, including a mobile device currently uploading respective data:

preempting current upload of the respective data of the mobile device; and uploading the data of the new mobile device.

20. The method of claim 11, further comprising, whenever current upload of data of a mobile device received at the plurality of charging stations is completed:

begin uploading of respective data of a next mobile device received at the plurality of charging stations, based on an amount of the respective data of the next mobile device being smaller than the respective data for upload of other mobile devices received at the plurality of charging stations.

* * * * *